United States Patent
Rees et al.

(10) Patent No.: US 6,606,167 B1
(45) Date of Patent: Aug. 12, 2003

(54) CALIBRATING A PRINTER USING A SELF-PRINTED CHART

(75) Inventors: Clive Rees, Girton (GB); Mike Scrutton, Attleborough (GB); Pip Tallents, Shelfhanger (GB)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/323,745

(22) Filed: Jun. 1, 1999

(51) Int. Cl.[7] .................................................. H04N 1/46
(52) U.S. Cl. ........................................ 358/1.9; 358/3.21
(58) Field of Search ........................ 358/1.9, 3.21–3.23, 358/518–523

(56) References Cited

U.S. PATENT DOCUMENTS

| | | | | |
|---|---|---|---|---|
| 5,317,425 A | * | 5/1994 | Spence et al. | 358/504 |
| 5,598,272 A | * | 1/1997 | Fisch et al. | 347/19 |
| 5,793,414 A | * | 8/1998 | Shaffer | 725/114 |
| 6,062,137 A | * | 5/2000 | Guo et al. | 101/171 |
| 6,384,895 B1 | * | 5/2002 | Sawano | 347/183 |
| 6,411,318 B1 | * | 6/2002 | Sawano et al. | 347/184 |

OTHER PUBLICATIONS

"Using Adobe Gamma," Photoshop 5 Color Management Workflows, Technical Guide, downloaded from www.adobe.com/supportservice/custsupport, 9 pgs., May 27, 1999.

Hewlett Packard 2500c, example of color balance implementation for color calibration, 2 pgs.

Bann et al., "Colour proof correction," Question and answer book, pp. 66–67, 70–71, May 1990.

* cited by examiner

Primary Examiner—Thomas D. Lee
Assistant Examiner—Stephen Brinich
(74) Attorney, Agent, or Firm—Fish & Richardson P.C.

(57) ABSTRACT

Methods and apparatus, including computer program apparatus, for calibrating a printer. A color reference is printed for a reference tint. The color reference is a coarse halftone screen printed using a single colorant. A sample for each of multiple tints of the colorant are printed using a normal printing mode of the printer. A user views the printed substrate and provides a calibration input based on the user's comparison of the printed samples to the printed color reference. The transfer curve of the printer is modified according to the calibration input. A color sample and a color reference both based on one colorant are printed for human visual comparison by printing the sample and the reference simultaneously on a substrate, the sample surrounded by the reference, the reference being printed as a coarse halftone screen of the colorant and the sample being printed as a tint of the colorant in a normal mode of operating the printer. A stable invariant color reference is printed on a computer printer by printing a coarse screen of full ink on a computer printer to make the stable invariant color reference on the computer printer.

24 Claims, 3 Drawing Sheets

CALIBRATING A PRINTER USING A SELF-PRINTED CHART

BACKGROUND

Any printable color can be made up by mixing together appropriate concentrations of cyan and magenta and yellow inks. Black ink is very often used in addition in order to provide denser blacks, and single inking for black text. Other inks in addition, such as red and green or light cyan, light magenta, light yellow are also used on some printers.

The accuracy of the resultant color depends the accuracy of the concentration of each of the inks making it up. For a given set of inks, the color can be defined by the amounts of each ink being used. Controlling the amount of each ink that is put down is critical for the accurate reproduction of color images.

Laying the inks all over the paper with varying thickness of inks is one way to create variable color. In this process the amount of ink actually applied is critical to the color. This is said to be continuous tone. Chemical photographic prints work like this with cyan, magenta and yellow dyes.

Another way to create an effectively variable concentration for each ink is halftone screening. In this technique a layer of ink of uniform thickness is put on the paper with a fine dot pattern. The halftone dots are of variable size (or may be of variable frequency), and the resultant viewed color (averaged over a small area) depends on the proportion by area of the paper that is covered by that ink. This is known as the dot percentage (dot %). Zero percent (0%) dot is white paper. One hundred percent (100%) dot is solid ink.

Computer printers for home and office use have only in recent years become capable of imaging photographs. To do so, such printers use continuous tone or, more often, halftone techniques or a mix of the two techniques. Color from such printers has generally not been very accurate, but this is now changing. When such printers—or any printers, for that matter—use halftones, the printing process is subject to varying dot gain, which must be controlled for good results.

Color management systems using color profiles are now commonly available on personal computer systems. A color management system is a collection of color management software tools used to try to make color device-independent. Ideally, the colors on a computer monitor accurately represent the colors in a scanned image, or the colors on a printed page. A color profile describes a complete table of all the colors that a device can input or reproduce.

The chemistry, concentration and colorimetry of printing inks is controlled very accurately in the manufacturing process. Essentially all printers of a printer family use identical ink. By design, the color of an ink may differ from a pure color. Generally, for example, cyan ink is pure cyan plus some (e.g., 30%) pure magenta plus a trace (e.g., 5%) of pure yellow; that is, the ink is actually to the blue side of cyan. Similarly, magenta ink is generally pure magenta plus some (e.g., 30%) pure yellow; that is, it is actually to the red side of magenta. Generally, yellow ink is pure yellow with very little impurity; and black ink is pure black.

In this specification, the part of a printer that delivers ink to paper will be referred to as a 'print head'. The print head may be replaceable, and it may be made up of multiple, separately-replaceable units.

The amount of ink that is put down in each pel (a pel is a printing element or dot) can vary from one print head to another by perhaps as much as 20%. This alters the average color of any small area both because the larger volume of ink spreads sideways creating a larger area pel, and may within the pel form a thicker layer of ink of greater density. The halftone dots used in printing an image are generally but not necessarily made from more than one printer pel. Some print heads can create pels of several sizes.

If a particular instance of a printing system puts down more ink than is intended, the system is said to be exhibiting dot gain. For example, if 60% of a paper area is covered in ink where 50% coverage was requested, the system is said to be exhibiting 10% dot gain. Strictly speaking, this terminology only applies to halftone reproduction. However, it can be applied to continuous tone reproduction by measuring the density of the ink component of a color and calculating the equivalent dot % to produce the same color.

Dot gain is not constant. Dot gain can change when a print head is replaced and as a print head ages. Different paper types can also exhibit different dot gain.

Electronic printing devices generally exhibit nonlinear output behavior. A transfer function adjusts the values of color components to compensate for nonlinear response in an output device and in the human eye. Each component of a device color space is intended to represent the perceived lightness or intensity of that color component in proportion to the component's numeric value. Many devices do not actually behave this way, however; the purpose of a transfer function is to compensate for the device's actual behavior.

A transfer function is often thought of as a curve and may therefore be referred to as a transfer curve or halftone curve. A transfer function can be implemented simply as a one-dimensional look-up-table of output values for input values. The output values define the shape of a curve which compensates for the output characteristic of the printer. Transfer functions are described in reference works such as Adobe Systems Incorporated, PostScript® LANGUAGE REFERENCE third edition, section 7.3, Transfer Functions, pages 478 et seq. An appropriately defined transfer curve can compensate for dot gain in a printer.

The prior art includes at least five different approaches to achieving consistency in the color which printers reproduce. In one approach, printer control software is provided that includes a simple way of making the output lighter or darker, by turning a metaphorical dial, for example. In a second approach, the user prints a picture that the user is familiar with and adjusts parameters of some color space, repeatedly printing the picture until satisfied with the result. In a third approach, a reference image is printed and measured using a spectrophotometer or densitometer. In a fourth approach, the printer incorporates a densitometer and is capable of recalibrating itself. The fifth approach is a 'grey balance' method, where a gray patch of color is compared to a mix of cyan, magenta and yellow ink that gives a grey color. The user picks from a series of CMY (cyan, magenta, yellow) patches the patch which looks most like a reference gray patch.

SUMMARY OF INVENTION

The problem of undesirable dot gain can be corrected by increasing or reducing the quantity of ink used to print a required color. To determine the amount of correction required for each of the inks, a visual calibration assessment chart is printed on the printer. For each of one or more colors of ink in the print head, the user is shown a series of shaded patches of that ink. The user picks which shaded patch looks most like a fixed invariant shaded patch of the same color ink. The invariant patch is a color reference printed by the printer surrounding each instance of the differently shaded patches. The size of the correction is determined from the position of the shaded patch within the series.

The invariant patch is a stable reference created by printing a very coarse halftone screen. Because the dots of the invariant patch are large, the dot gain due to a change of print head is much smaller than that of the series of shaded patches, which are printed with normal halftoning. The dot gain of the normally halftoned shaded patches is assessed by visual comparison with the fixed invariant shaded patch.

In general, in one aspect, the invention provides techniques that can be implemented as methods, systems, or apparatus, including computer program apparatus, for calibrating a printer. The techniques include printing a color reference for a reference tint on a substrate, the color reference being a coarse halftone screen printed using a single colorant; printing a sample for each of multiple tints of the colorant, each sample being printed using a normal mode of the printer for printing the sample; receiving from a user who has viewed the printed substrate a calibration input based on the user's comparison of the printed samples to the printed color reference; and modifying the transfer curve of the printer according to the calibration input.

In general, in another aspect, the invention provides techniques for printing a color sample and a color reference both based on one colorant for visual comparison by a person. These techniques include printing the sample and the reference simultaneously on a substrate, the sample surrounded by the reference, the reference being printed as a coarse halftone screen of the colorant and the sample being printed as a tint of the colorant in a normal mode of operating the printer.

In general, in another aspect, the invention provides techniques for making a stable invariant color reference on a computer printer. These techniques include printing a coarse screen of full ink on a computer printer to make the stable invariant color reference on the computer printer.

Advantages that can be seen in implementations of the invention include one or more of the following.

The invention will work for printers which use either halftone or continuous tone, because a continuous tone device can print a coarsely screened halftone.

The invention can compensate for any change of dot gain, regardless of the reason for the change. For example, the change might occur because a different instance of the same printer model is being used, because a print head was changed, because a print head has aged, because different paper or other media are being used, or because a change in temperature or humidity has affected the appearance or behavior of the ink or medium.

The invention enables different printers to reproduce the same color with little or no perceivable difference. The invention requires no use of electronic or optical measuring devices. The invention reduces the problem of visual color matching by simplifying the choices that the user has to make.

The details of one or more embodiments of the invention are set forth in the accompanying drawings and the description below. Other features and advantages of the invention will become apparent from the description, the drawings, and the claims.

DETAILED DESCRIPTION

Figure 1:
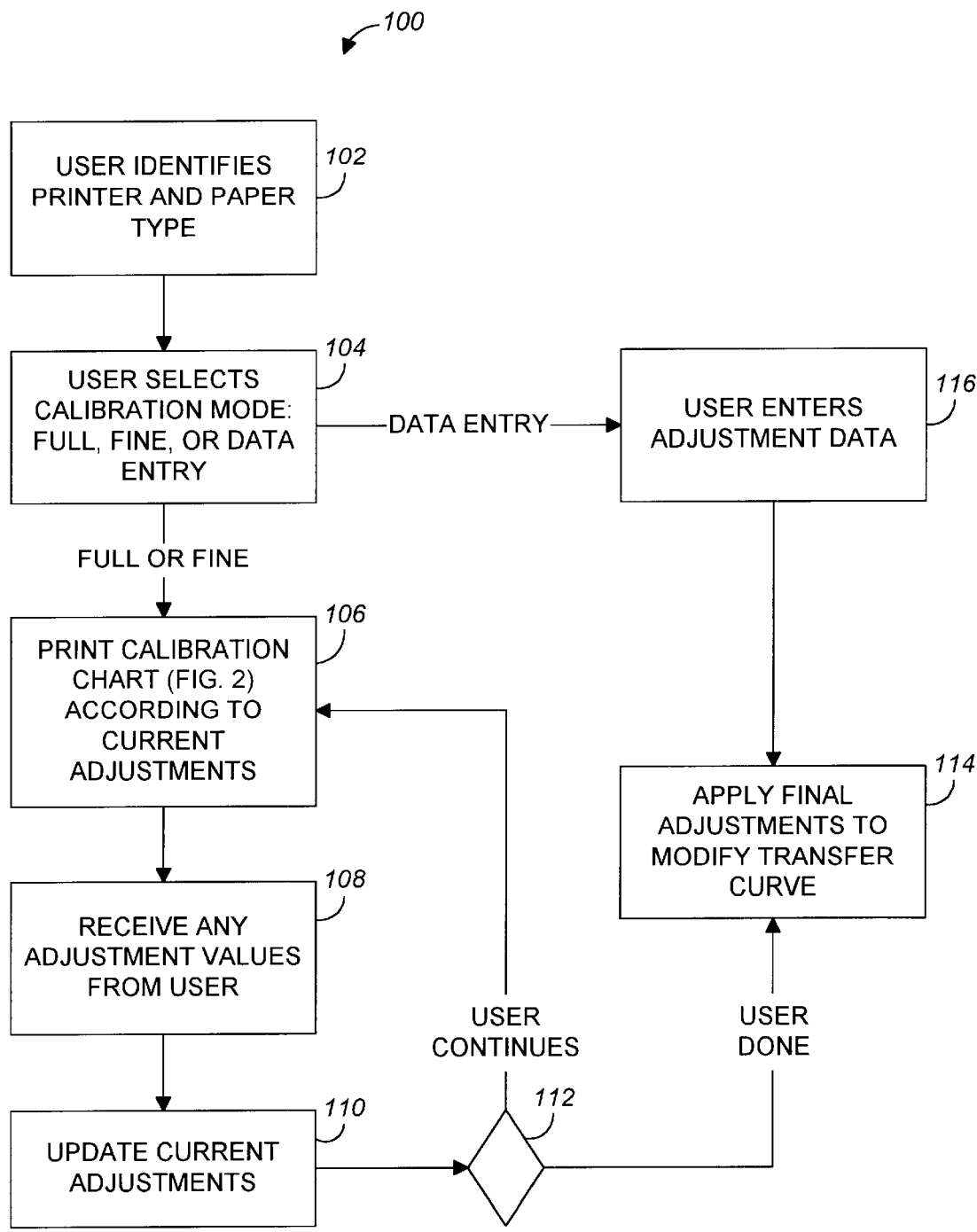
FIG. 1 is a flowchart illustrating a system operating in accordance with the invention.

A printer that exhibits undesirable positive or negative dot gain can be brought back to correct calibration by bending the system's transfer curve to an appropriate new shape. The inventors have found that although the print heads for a given family of printers will vary from one to another and require different transfer curves, the transfer curves are similarly shaped but bent to a greater or lesser degree. When the dot gain of an ink is known, then the amount by which its transfer curve should be bent to calibrate the printer is computed in a conventional way, which will now be described.

To compensate for a dot gain of G%, a three segment linear function is added to the existing transfer curve. From 0% to 50% input: a dot gain varying from 0% to—G% is added; from 50% input to 85% input: a dot gain of—G% is added; and from 85% input to 100% input: a dot gain varying from—G% to 0% is added. A 0% input is always 0% output, and 100% input is always 100% output.

In other implementations, more sophisticated curve bending algorithms can be used. However, because the original curve is generally determined experimentally by the factory and typically has a smooth exact shape, the added complexity is generally not needed. The curve resulting from the above-described adjustment retains its smoothly rounded shape.

Professional printers know that in the mid-tones (approximately 45% dot to 65% dot), all tints of an ink exhibit a similar dot gain. So if a system exhibits 5% dot gain anywhere in the mid-tones, then a 45% original comes out as 50% on paper, and a 50% original comes out as 55% and so on. If a series of tints such as 40%, 45%, 50%, 55%, and 60% are printed on a printer and compared with a known accurate 50% tint from a calibrated printer, the dot gain of the uncalibrated printer can be judged. For example, if it is actually the "45%" tint that looks like the real 50% then it can be concluded that the printer exhibits a 5% dot gain. The tints reproduced by the uncalibrated printer are different from what they should be by the amount of the dot gain.

To create a known accurate tint to use in making such a comparison, a system operating in accordance with the invention prints what will be called a color reference (or invariant color reference) on the printer. The color reference is made by printing a very coarse screen (i.e., halftone pattern) in the ink or inks in question. The inventors have found that a tint that is imaged by a very coarse halftone pattern looks the same when viewed from a distance (such as twelve feet for halftone dots having a frequency of 22 dots per inch) and exhibits very little dot gain compared to fine imaging produced by a normal operating mode on the same printer. Other low frequencies—below about 50 dots per inch—can also be used, and better results are achieved with frequencies less than about 30 dots per inch.

The area of a very coarse halftone dot covered in ink is covered with a full thick layer. This thick layer does not change color with small changes of its thickness because it is already thicker than is needed for full color. The dot gain due to the ink spreading sideways and enlarging the inked area is small relative to the large geometry of the coarse halftone pattern. The pattern used has round dots that have minimum perimeter over which ink spreads, thus providing excellent color stability.

In one implementation, the coarse screen is about 55% dot, which looks like round white dots on an ink background. Generally, in halftone patterns anything less than 50% dot looks like ink dots on paper background, and anything greater than 50% dot looks like paper dots on an ink background. An exact 50% dot pattern would be a poor choice for stability because the dots just about join each other and surface tension effects may or may not suck ink across the paper at the join points. In other implementations, the coarse screen is in a range of about 52% dot to about 60% dot. While it is easier to use a coarse screen with a mid-tone tint, a tint anywhere between about 20% dot to about 80% dot can be used.

In contrast to the color stability of the invariant color reference, a finely screened normal patch of tint exhibits dot gain both due to variations in the thickness of its thinner layers of ink, and in the sideways expansion of ink across the paper from the relatively large circumference of the small halftone dots.

Two colors are normally compared by holding them side by side. Looking at a patch of one color completely surrounded by the other works even better. Six patches over a background waffle seems to work even better. The eye can compare the colors without moving from one to another and the edge between the colors is long. Each patch is the same color printed in a finely screened area within the very coarse screened color reference.

The inventors have found that the color of the color reference made by the above method can generally never exactly match an ink sample of a single ink, because the relative amount of color impurity increases in the thick layer of ink used in the color reference. To compensate for this effect, an appropriate percentage of color contamination is added within the ink samples of the finely screened patches. This makes color matching possible without compromising the principle of operation of the calibration chart. The amounts for a family of printers are determined by experiment and are added to each sample in the series as a percentage of the sample's main ink value when the sample is printed.

Figure 2B:
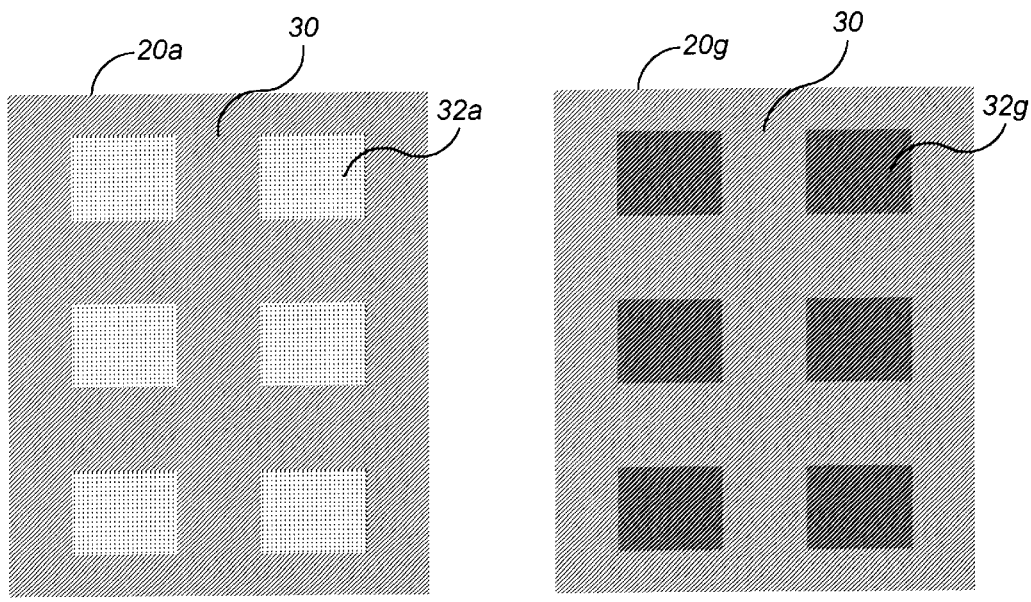
FIGS. 2A and 2B are schematic diagrams illustrating a calibration chart and its elements.
Figure 2A:
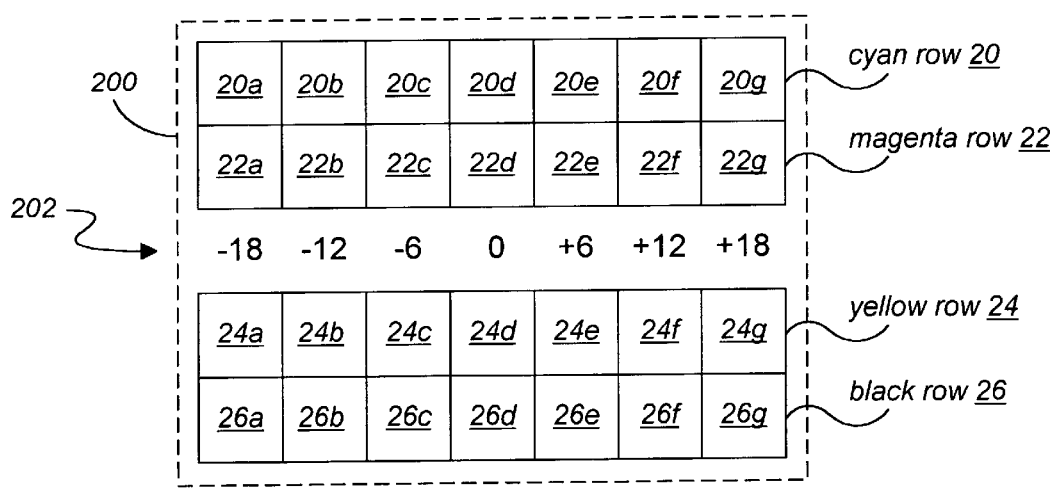
Figure 3:
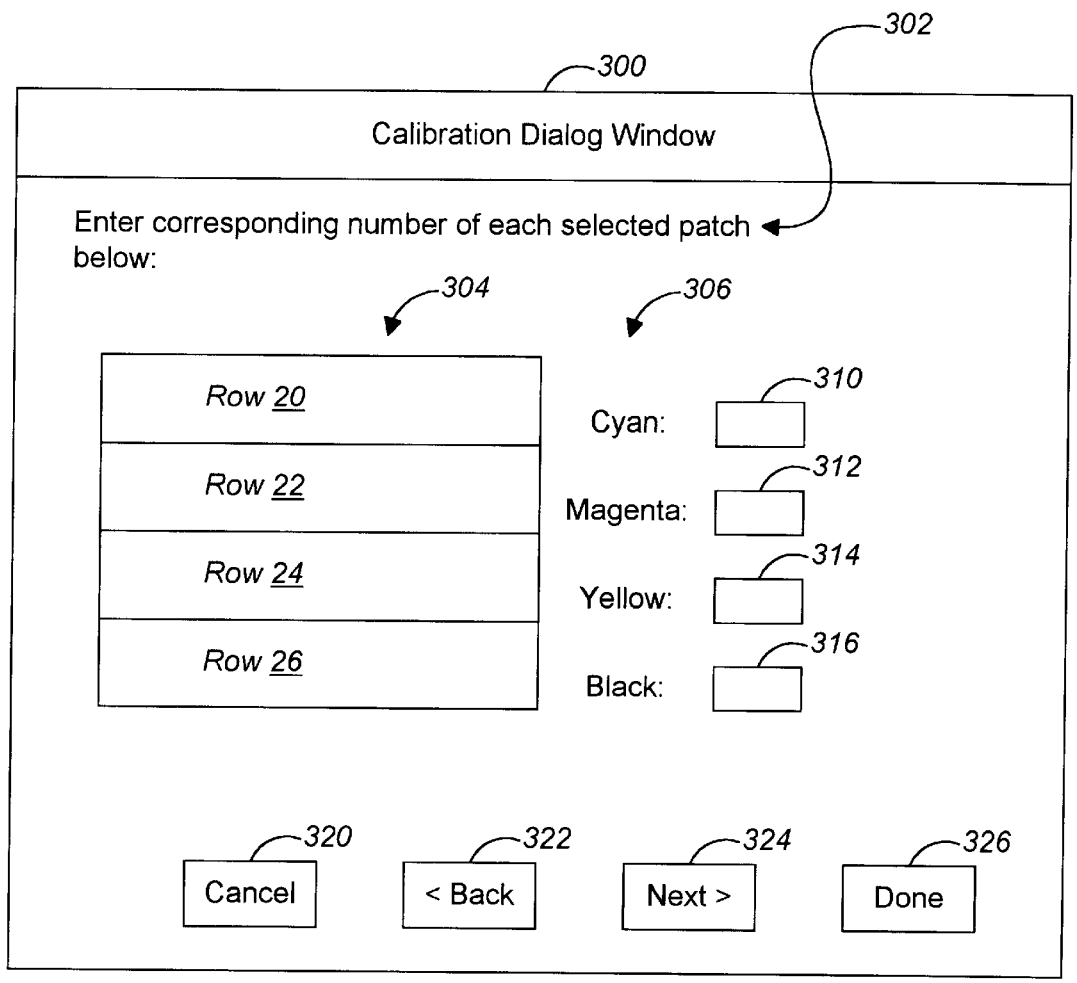
FIG. 3 is a schematic diagram illustrating a user interface window of the system of FIG. 1.

As illustrated in FIGS. 1–3, a printer calibration tool (which will also be referred to simply as the 'tool') provides a user with a mechanism to calibrate the transfer curves for a printer to compensate for dot gain, whether caused by manufacturing differences in print heads, inks and media, or otherwise.

As illustrated in FIG. 1, the tool is implemented in the style of a wizard, where the user is guided through the required steps (method 100). The printer calibration tool adjusts the transfer curves based on information provided by the user. It prints a calibration chart (illustrated in FIG. 2) for a specified printer with appropriate settings for paper type and paper size, which the user has selected (step 102). Any changes made will only affect the selected printer, but all media supported by that printer will be updated.

The tool can calibrate a printer in three ways, of which the user selects one (step 104). Full calibration is recommended for initial calibration or any time the print heads are changed. Fine tune calibration is recommended if the printer has been previously calibrated and the user wants to fine tune the calibration settings. Data entry is used if another user has calibrated another printer and the values are to be applied to this printer as well. If either the full calibration or the fine tune calibration option is selected, a calibration chart is printed (step 106).

Viewing the calibration chart, the user selects values that will be entered in a later dialogue. These values will be used to modify the transfer curves and hence calibrate the printer. The process can be repeated until the user is satisfied that their printer is calibrated.

As illustrated in FIG. 2A, the calibration chart 200 is designed to allow a user to select an adjustment value for each ink. The chart has a number of rows 20, 22, 24, 26 of "waffles", one row for each ink in the printer (e.g., cyan, magenta, yellow and black). Cyan row 20 includes waffles 20a through 20g; magenta row 22, waffles 22a through 22g; yellow row 24, waffles 24a through 24g; and black row 26, waffles 26a through 26g. Each waffle is about 40 millimeters (mm.) high and 30 mm. wide. The chart fits on an A4 or an 8½-11 inch sheet of paper.

As illustrated in FIG. 2B, a waffle (such as waffles 20a and 20g) is an invariant color reference 30 surrounding six identical ink samples, such as samples 32a and 32g in waffles 20a and 20g, respectively. As the samples are identical in color, they will be referred to as a single "ink sample". Each row is a series of waffles. Each waffle in the series (reading left to right) has a slightly different ink sample color—in the present implementation it contains a more dense ink sample. The waffles within each series are numbered with the central waffle numbered '0'. Waffles to the left of the center are numbered in decreasing steps and waffles to the right in increasing steps.

When observing a printed chart, for each row the user picks the waffle where the ink sample looks most like the invariant color reference. The corresponding number in the legend (row 202) is the "adjustment value" for that row. The user may choose an intermediate number as the adjustment value if the user feels that two adjacent waffles represent "too light" and "too dark". There are two versions of the calibration chart. One is only used when performing a full calibration and a second which is used to fine tune the calibration. The full calibration chart has waffles with possible adjustment values of −18, −12, −6, 0, +6 +12, and +18, (as shown in FIG. 2A) and the fine tune chart has adjustment values of −6, −4, −2, 0, +2, +4, and +6.

When printing the fine calibration chart, the tool looks at the values of calibration that have been established in the full calibration. The tool computes from the full calibration values an imputed dot gain of normal printing. The tool then calculates a dot gain in the coarse screen as a small percentage factor of the imputed dot gain. The percentage factor is determined for a printer family by experiment. When the fine calibration chart is printed, the dot % of the invariant reference color is reduced by this amount (dot gain× percentage factor).

When the tool is launched, the initial settings dialogue is displayed. The user first selects the printer to calibrate from a list of printers that are supported by the tool, and the installed paper type and size are then selected (step 102). (The list of paper types is restricted to papers that are suitable for the calibration process. The tool will recalibrate all media supported by the selected printer based on the data obtained for the media used by the calibration process.) The initial dialogue also displays the current calibration values for the selected printer—these are the results from a previous session of the tool with the selected printer. Once the user has made the appropriate settings the user presses the "Next" button and an options dialogue will appear.

The user selects one of Full Calibration, Fine Tune Calibration or Enter Values. Having done so, the user presses the "Next" button and a dialogue for the option selected appears (step 104 and one of steps 106 or 116).

As the full calibration dialogue is displayed, a calibration sheet is printed (step 106), initially with adjustment values of −18, −12, −6, 0, +6 +12 and +18. The user should observe the sheet from a distance of approximately 12 feet and determine the adjustment value for each row (i.e., the value corresponding to the position where the ink sample looks most like the invariant color reference). The user enters that value on the corresponding row of the dialogue (step 108). Once all of the balance points have been entered, the user presses the "Next" button and the current adjustments are updated (step 110). After the initial printing of a full calibration chart, if the user continues the process ("user continues" branch of decision step 112), the fine tune calibration dialogue appears. The user may return to printing calibration charts and changing adjustment values until the user is satisfied with the results.

As the fine tune calibration dialogue is displayed, a calibration sheet is printed with adjustment values of −6, −4, −2, 0, +2, +4 and +6. As before, the user observes the sheet from a distance of approximately 12 feet and determines the adjustment value for each row. The user enters that value on the corresponding row of the dialogue. Once all of the balance points have been entered, the printer could be considered calibrated. If the user would like to confirm this, pressing a "Try Again" button will cause an updated fine tune calibration chart to be printed and the process is repeated. Visual confirmation that the process is complete is that the value '0' should be selected for each adjustment value. The user confirms that he or she is satisfied that the calibration is complete by pressing a "Done" button. This causes the affected transfer function to be modified (step 114). The sums of the adjustment values entered for each row are calculated and retained for display on the settings dialogue as the current calibration values the next time that the tool is launched.

If the user selected data entry (step 104), a data entry dialogue allows the user to enter calibration values that have been obtained from another user's calibration of the same printer (step 116). The adjustment values to be entered can be obtained from the current calibration values on the second user's settings dialogue. Once the values have been entered, the user presses a "Done" button, causing the affected transfer functions to be modified (step 114).

FIG. 3 is a schematic diagram of one of the dialog windows of the tool, a calibration dialog window 300. The window displays instructions 302 to the user, a representation 304 of the printed calibration chart, and data entry fields 310, 312, 314, 316 corresponding to rows 20, 22, 24, and 26, respectively, in which the user enters adjustment values. The rows and fields are labeled 306 for the user's convenience. The window also includes navigation buttons 320, 322, 324, 326 of the conventional kind.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results. The waffle pattern need not be based on rectangles; it can be based on circles, ellipses, hexagons, or other shapes. The number of samples within a waffle cell can be greater or less than six. The waffle cells for a single colorant can be arranged vertically as well as horizontally and can be arranged on one or more sheets of paper. Multiple rows (or columns or clusters) of waffles can be used for each colorant with different tints for each row; for example, the invariant color reference of one row can be 40% dot and that of the other, 80% dot. The colorant need not be ink. It can be any colorant applied to any substrate; for example, it can be dye, wax, or toner used in a dye sublimation, wax transfer, or toner fusion printing process.

What is claimed is:

1. A method of calibrating a printer operable to print tints of colorants and whose printing of tints is adjusted by a transfer curve, comprising:

printing a color reference for a reference tint on a substrate using a printer, the color reference being a coarse halftone screen printed using a single colorant;

printing a sample for each of multiple tints of the colorant, on the same substrate, using the same printer, each sample being printed using a normal mode of the printer for printing the sample;

receiving from a user who has viewed the printed substrate a calibration input based on the user's comparison of the printed samples to the printed color reference; and modifying the transfer curve of the printer according to the calibration input.

2. The method of claim 1, wherein:

the substrate is paper; and the single colorant is an ink of the color cyan, magenta, yellow, or black.

3. The method of claim 1, wherein:

the samples in the aggregate are a series of tints of the colorant;

the coarse halftone screen has a frequency less than about 50 dots per inch;
the coarse halftone screen dots are between 20% dot and 80% dot;
the samples are printed through the transfer curve; and
each sample is printed surrounded by the color reference.

4. The method of claim 3, wherein:
the samples in the aggregate are a series in the mid-tones of the colorant ink;
the coarse halftone screen has a frequency less than about 30 dots per inch; and
the coarse halftone screen dots are between 40% dot and 80% dot.

5. The method of claim 4, wherein:
the coarse halftone screen has a frequency of about 22 dots per inch; and
the coarse halftone screen dots are about 55% dot.

6. The method of claim 1, wherein:
a color reference and multiple samples are printed on the substrate as recited in claim 1 for multiple colorants.

7. The method of claim 1, wherein:
a color reference and multiple samples are printed on the substrate as recited in claim 1 for multiple colorants; and
the color reference and each sample are printed simultaneously and in a waffle pattern with multiple instances of each sample within the waffle.

8. The method of claim 4, wherein:
a color reference and multiple samples are printed on the substrate as recited in claim 1 for multiple colorants; and
the color reference and each sample are printed simultaneously and in a waffle pattern with multiple instances of each sample within the waffle.

9. The method of claim 4, further comprising:
repeating the steps of claim 1 until the user indicates calibration of the printer is complete.

10. The method of claim 2, wherein:
the color reference and the multiple tints of the colorant are printed simultaneously.

11. A method of printing a color sample and a color reference both based on one colorant for visual comparison by a person, comprising:
printing the sample and the reference simultaneously on a substrate using a printer, the sample surrounded by the reference, the reference being printed as a coarse halftone screen of the colorant and the sample being printed as a tint of the colorant in a normal mode of operating the printer.

12. The method of claim 11, wherein:
the sample is a mid-tone tint of the colorant; and
the sample is printed in multiple instances each of which is surrounded by printed reference.

13. The method of claim 11, wherein:
the colorant is a first ink formulated to have a color impurity represented by a second ink; and
the reference is printed using only the first ink in a relatively thick layer and the sample is printed using the first ink and the second ink in a relatively thin layer, the amount of the second ink being selected to compensate for the effect that the relative amount of color impurity increases in the relatively thick layer of the first ink.

14. A system having a computer and a printer, the computer and printer being operable to print tints of colorants and whose printing of tints is adjusted by a transfer curve, the system comprising:
means for printing a color reference for a reference tint on a substrate, the color reference being a coarse halftone screen printed on the printer using a single colorant;
means for printing a sample for each of multiple tints of the colorant, on the same substrate, using the same printer, each sample being printed using a normal mode of the same printer for printing the sample;
means for receiving from a user who has viewed the printed substrate a calibration input based on the user's comparison of the printed samples to the printed color reference; and
means for modifying the transfer curve of the printer according to the calibration input.

15. The system of claim 14, wherein:
the means for printing the samples prints an aggregate of a series of tints of the colorant;
the means for printing the color reference prints the coarse halftone screen at a frequency less than about 50 dots per inch; and
the means for printing the color reference prints the coarse halftone screen dots between 20% dot and 80% dot.

16. The system of claim 15, wherein:
the means for printing the samples prints an aggregate of a series of mid-tones of the colorant ink;
the means for printing the color reference prints the coarse halftone screen at a frequency less than about 30 dots per inch; and
the means for printing the color reference prints the coarse halftone screen dots between 40% dot and 80% dot.

17. The system of claim 14, wherein:
the means for printing prints a color reference and multiple samples on the substrate as recited in claim 13 for multiple colorants; and
the means for printing prints the color reference and each sample in a waffle pattern with multiple instances of each sample within the waffle.

18. The system of claim 14, wherein:
the means for printing prints a colorant that is a first ink formulated to have a color impurity represented by a second ink; and
the means for printing prints the reference using only the first ink in a relatively thick layer and the sample is printed using the first ink and the second ink in a relatively thin layer, the amount of the second ink being selected to compensate for the effect that the relative amount of color impurity increases in the relatively thick layer of the first ink.

19. A system for printing a color sample and a color reference both based on one colorant for visual comparison by a person, comprising:
a printer operable to print the colorant on a substrate; and
means for causing the printer to print the sample and the reference simultaneously on the substrate, the sample surrounded by the reference, the reference being printed as a coarse halftone screen of the colorant and the sample being printed as a tint of the colorant in a normal mode of operating the printer.

20. A computer program product, tangibly stored on a computer-readable medium, for controlling a printer, the printer being operable to print tints of colorants and whose printing of tints is adjusted by a transfer curve, the product comprising instructions operable to cause a programmable processor coupled to the printer to:

print a color reference for a reference tint on a substrate, the color reference being a coarse halftone screen printed using a single colorant;

print a sample for each of multiple tints of the colorant, on the same substrate, using the same printer, each sample being printed using a normal mode of the printer for printing the sample;

receive from a user who has viewed the printed substrate a calibration input based on the user's comparison of the printed samples to the printed color reference; and modify the transfer curve of the printer according to the calibration input.

21. The computer program product of claim 20 further comprising instructions operable to cause a programmable processor coupled to the printer to:

print the samples in an aggregate of a series of tints of the colorant;

print the coarse halftone screen at a frequency less than about 50 dots per inch; and print the coarse halftone screen dots between 20% dot and 80% dot.

22. The computer program product of claim 20 further comprising instructions operable to cause a programmable processor coupled to the printer to:

print a color reference and multiple samples on the substrate as recited in claim 15 for multiple colorants; and print the color reference and each sample in a waffle pattern with multiple instances of each sample within the waffle.

23. The computer program of claim 20 further comprising instructions operable to cause a programmable processor coupled to the printer to:

print a colorant that is a first ink formulated to have a color impurity represented by a second ink; and print the reference using only the first ink in a relatively thick layer and the sample is printed using the first ink and the second ink in a relatively thin layer, the amount of the second ink being selected to compensate for the effect that the relative amount of color impurity increases in the relatively thick layer of the first ink.

24. A computer program product, tangibly stored on a computer-readable medium, for printing a color sample and a color reference both based on one colorant for visual comparison by a person on a printer operable to print tints of colorants, the product comprising:

instructions operable to cause a programmable processor coupled to the printer to cause the printer to print the sample and the reference simultaneously on the substrate, the sample surrounded by the reference, the reference being printed as a coarse halftone screen of the colorant and the sample being printed as a tint of the colorant in a normal mode of printing a tint on the printer.

* * * * *